(12) United States Patent
Park et al.

(10) Patent No.: US 12,480,007 B2
(45) Date of Patent: Nov. 25, 2025

(54) COATING COMPOSITION

(71) Applicant: LG Chem, Ltd., Seoul (KR)

(72) Inventors: Jun Hyoung Park, Daejeon (KR); Mi Seon Kim, Daejeon (KR); Kwang Su Seo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 863 days.

(21) Appl. No.: 17/295,712

(22) PCT Filed: Nov. 28, 2019

(86) PCT No.: PCT/KR2019/016590
§ 371 (c)(1),
(2) Date: May 20, 2021

(87) PCT Pub. No.: WO2020/111821
PCT Pub. Date: Jun. 4, 2020

(65) Prior Publication Data
US 2022/0002566 A1    Jan. 6, 2022

(30) Foreign Application Priority Data
Nov. 30, 2018 (KR) .................. 10-2018-0152230

(51) Int. Cl.
C09D 7/65        (2018.01)
C08K 5/07        (2006.01)
C09D 7/63        (2018.01)
C09D 183/04      (2006.01)
C09J 7/38        (2018.01)
C09J 7/40        (2018.01)

(52) U.S. Cl.
CPC .................. *C09D 7/65* (2018.01); *C08K 5/07* (2013.01); *C09D 7/63* (2018.01); *C09D 183/04* (2013.01); *C09J 7/383* (2018.01); *C09J 7/401* (2018.01)

(58) Field of Classification Search
CPC ............................... C08K 5/07; C09D 183/04
See application file for complete search history.

(56) References Cited

U.S. PATENT DOCUMENTS

| 4,368,945 A | 1/1983 | Fujimori et al. |
| 5,652,078 A | 7/1997 | Jalbert et al. |
| 2008/0225077 A1* | 9/2008 | McAvoy .............. B41J 2/1631 427/576 |
| 2010/0239508 A1 | 9/2010 | Mori et al. |

(Continued)

FOREIGN PATENT DOCUMENTS

| CN | 107797164 A | 3/2018 |
| GB | 2057355 A | 4/1981 |

(Continued)

OTHER PUBLICATIONS

English language translation of KR101842832B1, pp. 1-24.*

(Continued)

*Primary Examiner* — Alexander C Kollias
(74) *Attorney, Agent, or Firm* — Lerner David LLP

(57) ABSTRACT

A coating composition is provided. The coating composition of the present application has excellent compatibility between the components. In addition, there is an advantage that the release layer formed from the coating composition of the present application has low transmittance for light having a wavelength of 380 nm or more.

17 Claims, 3 Drawing Sheets

(56) References Cited

U.S. PATENT DOCUMENTS

| | | | |
|---|---|---|---|
| 2016/0256371 A1 | | 9/2016 | Feng et al. |
| 2017/0298251 A1* | | 10/2017 | Park .................. C09D 7/65 |
| 2018/0067231 A1 | | 3/2018 | Chang et al. |

FOREIGN PATENT DOCUMENTS

| | | | |
|---|---|---|---|
| JP | H6328626 | A | 11/1994 |
| JP | 2002208481 | A | 7/2002 |
| JP | 2004163800 | A | 6/2004 |
| JP | 2005324346 | A | 11/2005 |
| JP | 2007275890 | A | 10/2007 |
| JP | 2014233913 | A | 12/2014 |
| JP | 2017065171 | A | 4/2017 |
| JP | 2017167312 | A | 9/2017 |
| KR | 20100069662 | A | 6/2010 |
| KR | 101766284 | B1 | 8/2017 |
| KR | 101842832 | B1 | 5/2018 |
| TW | 201619311 | A | 6/2016 |
| WO | 2017222328 | A1 | 12/2017 |

OTHER PUBLICATIONS

IPCS INCHEM, pp. 1-2.*
Chemical Book—Toluene, pp. 1-2.*
Heptane Solvent Properties, pp. 1-2.*
Methyl Ethyl Ketone Solvent Properties, pp. 1-2.*
Oskooie, et al, Titled "Solvent-Free L-Proline Catalysed Condensation of Ethyl Cyanoacetate With Aldehydes"; Journal of Chemical Research 2006, Oct. 13, 2005, pp. 246-247.
International Search Report for Application No. PCT/KR2019/016590 mailed Mar. 9, 2020, pp. 1-3.
Shahbazi, F. et al., "Synthesis, characterization and heterogeneous catalytic activity of diamine-modified silica-coated magnetite-polyoxometalate nanoparticles as a novel magnetically-recoverable nanocatalyst", Catalysis Communications, Jun. 2014, pp. 57-64, vol. 55, Elsevier, Iran.
Taiwanese Search Report for Application No. 108143599 dated Jan. 12, 2021, 1 page.
Search Report dated May 26, 2022 from the Office Action for Chinese Application No. 201980074273.1 issued Jun. 1, 2022, pp. 1-2. [See p. 1, categorizing the cited references].
Extended European Search Report including Written Opinion for Application No. 19890586.1 dated Feb. 4, 2022, pp. 1-7.

* cited by examiner

COATING COMPOSITION

CROSS REFERENCE TO RELATION APPLICATIONS

The present application is a national stage entry under 35 U.S.C. § 371 of International Application No. PCT/KR2019/016590 filed on Nov. 28, 2019, which claims priority to Korean Patent Application No. 10-2018-0152230 filed on Nov. 30, 2018, the disclosures of which are incorporated herein by reference in their entirety.

TECHNICAL FIELD

The present application relates to a coating composition.

BACKGROUND ART

A release film is used in various technical fields such as a display unit field of a liquid crystal display and the like, a coating field or a pressure-sensitive adhesive field. The release film mainly serves to protect a surface of a target article. Such a release film is attached to the target article during manufacture, transportation and storage processes of the target article or the like, but is removed (specifically peeled) from the target article upon manufacturing a final article.

In particular, pressure-sensitive adhesives are distributed in a semi-cured state, so-called soft state, for attachment to various members according to the recent technology trend. At this time, the pressure-sensitive adhesive is distributed in the form of a pressure-sensitive adhesive sheet that a heavily peeling release film is attached to one side and a lightly peeling release film is attached to the other side. When an adhesion objet substance is attached to an adherend using the pressure-sensitive adhesive sheet, a method of detaching the lightly peeling release film, attaching the exposed pressure-sensitive adhesive to the adherend, and then detaching the heavily peeling release film is applied. Thereafter, the pressure-sensitive adhesive may also be finally cured by a method such as ultraviolet irradiation to fix the pressure-sensitive adhesive between the adhesion object substance and the adherend.

In general, the pressure-sensitive adhesive is cured by irradiation with ultraviolet rays or the like as such. That is, when the pressure-sensitive adhesive is exposed to ultraviolet rays or the like during its transporting process, the pressure-sensitive adhesive property of the relevant pressure-sensitive adhesive may also be lowered even before the pressure-sensitive adhesive is attached to the adherend by the post-curing thereof. Therefore, when the release film is used to protect the surface of the pressure-sensitive adhesive or the like, the release film should function so as not to be exposed to ultraviolet rays or the like during the transporting process of the pressure-sensitive adhesive.

In this regard, in the process of manufacturing the release film, an ultraviolet absorber is added to a coating liquid containing a silicon-based compound. At this time, the ultraviolet absorber should ensure compatibility with the silicon-based compound in the coating solution, but the compatibility is largely dependent on the type of solvents included in the coating solution.

Technical Problem

The present application relates to a coating composition.

Technical Solution

In the present application, the term "alkyl group" may mean an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group may be a linear, branched or cyclic alkyl group, and may be optionally substituted by one or more substituents.

In the present application, the term "aryl group" may mean, unless otherwise specified, a monovalent residue or divalent residue derived from a compound comprising one benzene structure, or a structure in which two or more benzene rings are linked while sharing one or two carbon atoms, or linked by any linker, or a derivative thereof The aryl group may be, for example, an aryl group having 6 to 30 carbon atoms, 6 to 25 carbon atoms, 6 to 21 carbon atoms, 6 to 18 carbon atoms, 6 to 13 carbon atoms or 6 to 12 carbon atoms, unless otherwise specified.

In the present application, the substituent, by which the alkyl group, aryl group, linear chain or aromatic structure may be optionally substituted, may be exemplified by a hydroxyl group, a halogen atom, a carboxyl group, a glycidyl group, an acryloyl group, a methacryloyl group, an acryloyloxy group, a methacryloyloxy group, a thiol group, an alkyl group, an alkenyl group, an alkynyl group, an alkylene group, an alkenylene group, an alkynylene group, an alkoxy group or aryl group, and the like, but is not limited thereto.

The present application relates to a coating composition. The coating composition of the present application comprises, for example, at least a release agent. As long as the release agent comprises a component capable of exhibiting release properties (deformability), the type is not particularly limited. In general, a silicone resin may be applied as the release agent.

The coating composition may include a release agent; a solvent having a boiling point in a range of 79° C. to 115° C.; and a compound of Formula 1 below:

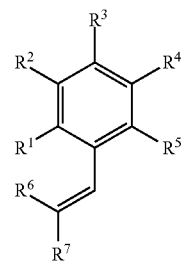

[Formula 1]

In Formula 1, $R^1$ to $R^5$ are each independently hydrogen, an alkyl group, $-OX^1$ or $-NX^1_2$, but one to two of $R^1$ to $R^5$ are $-OX^1$ or $-NX^1_2$, where $X^1$ is hydrogen or an alkyl group, and $R^6$ and $R^7$ are each independently hydrogen, a cyano group, $-C(=O)-X^2$, $-C(=O)-O-X^2$, $-O-C(=O)-X^2$, or $-NO_2$, where $X^2$ is an alkyl group or an aryl group.

In the present application, the term "coating composition" may mean a composition coated on any member in order to form a layer having predetermined physical properties or functions. In one example, the coating composition of the present application may also be coated on a polymer base material such as PET (polyethylene terephthalate) in order to form a release layer.

The silicone resin may function as a main material of the coating composition, and for example, the silicone resin may impart release performance to a release layer produced by using the coating composition. That is, the coating composition may be a release agent composition or a composition for a release agent.

In one example, a curable silicone resin may be used as the silicone resin. As the curable silicone resin, an addition-curable, condensation-curable or ultraviolet-curable silicone resin, and the like may be used.

As the addition-curing type silicone resin, a resin obtained by heat-curing polydimethylsiloxane having a vinyl group at the terminal and hydrogensiloxane in the presence of a platinum catalyst may be used. As the addition-curable silicone resin, a commercially available product such as KS-774, KS-843, KS-847, KS-847H or KS-847H from Shinetsu may be applied.

As the condensation-curable silicone resin, a resin obtained by heat-curing polydimethylsiloxane having a hydroxyl group at the terminal and hydrogensiloxane in the presence of an organic tin catalyst may be used. As the condensation-curable silicone resin, a commercially available product such as SRX290 or SYLOFF23 from Dow Corning may be applied.

As the ultraviolet-curable silicone resin, a resin which is subjected to addition reaction by hydrosilylating vinyl siloxane in presence of a platinum catalyst may be used. As the ultraviolet-curable silicone resin, a commercially available product such as X62-5039 or X62-5040 from Shinetsu may be used. In another example, as the ultraviolet-curable silicone resin, a radical addition-curable resin obtained by curing a siloxane having an alkenyl group and a siloxane having a mercapto group (—SH) using a photopolymerization catalyst may be used. As the radical addition-curable resin, a commercially available product such as BY24-510H or BY24-544 from Dow Corning may be applied.

In another example, as the ultraviolet-curable silicone resin, a cationic polymerization type silicone resin obtained by photo-opening the epoxy groups in the presence of an onium salt initiator and then curing them may be used. As the cationic polymerization type silicone resin, a commercially available product such as TPR6501, UV9300 or XS56-A2775 from Toshiba Silicon may be applied.

The release agent may comprise the silicone resin as a main component. That is, the release agent may comprise the silicone resin in an amount of about 50 wt % or more, 55 wt % or more, 60 wt % or more, 65 wt % or more, 70 wt % or more, 75 wt % or more, 80 wt % or more, 85 wt % or more, 90 wt % or more, or 95 wt % or more, based on the total. In another example, the amount may be about 100 wt % or less or about 99 wt % or less or so.

In addition to the silicone resin, the release agent may also further comprise an alkyd resin, a polyolefin-based resin, a long chain alkyl group-containing resin, a fluorine-based resin, a rubber-based resin, or a combination thereof in order to improve release properties and the like.

The coating composition of the present application may comprise a release agent in an amount of 1 to 20 wt %. In another example, the amount may be 2 wt % or more, 3 wt % or more, 4 wt % or more, 5 wt % or more, 6 wt % or more, 7 wt % or more, or 8 wt % or more, and may also be 19 wt % or less, 18 wt % or less, 17 wt % or less, 16 wt % or less, 15 wt % or less, 14 wt % or less, 13 wt % or less, 12 wt % or less, or 11 wt % or less.

In order to ensure compatibility between the components and to facilitate the application of the composition, the coating composition further comprises a solvent. Specifically, the coating composition of the present application comprises a solvent having a boiling point in a range of 79 to 115° C. By comprising a solvent having a boiling point in the above range, the coating composition may be easy to apply it, and may also ensure the compatibility of the release agent and an ultraviolet absorber to be described below.

When a solvent having a boiling point outside the above range, that is, a solvent having a boiling point of less than the above range or more than the above range is applied, an emulsion is formed depending on the mixing between the components of the coating composition, thereby forming a turbid solution, so that it may not be suitable for application to release films.

In one example, from the viewpoint of improving the compatibility between the release agent and the ultraviolet absorber to be described below, as the solvent, one having a density of 0.5 $g/cm^3$ to 1.5 $g/cm^3$ among those having a boiling point within the above range may also be used. In another example, the density of the solvent may be 0.55 $g/cm^3$ or more, 0.60 $g/cm^3$ or more, or 0.65 $g/cm^3$ or more, and may be 1.4 $g/cm^3$ or less, 1.3 $g/cm^3$ or less, 1.2 $g/cm^3$ or less, 1.1 $g/cm^3$ or less, 1.0 $g/cm^3$ or less, or 0.9 $g/cm^3$ or less.

In one example, from the viewpoint of improving the compatibility between the release agent and the ultraviolet absorber to be described below, as the solvent, one having a dielectric constant of 1 or more and 25 or less among those having a boiling point within the above range may also be used. In another example, the dielectric constant of the solvent may be 1.1 or more, 1.2 or more, 1.3 or more, 1.4 or more, 1.5 or more, 1.6 or more, 1.7 or more, 1.8 or more, or 1.9 or more, and may be 24 or less, 23 or less, 22 or less, 21 or less, 20 or less, or 19 or less. The dielectric constant may be a value measured at room temperature.

Among physical properties mentioned in this specification, when the measured temperature and/or pressure affects the physical property value, the relevant physical property means a physical property measured at room temperature and/or normal pressure, unless otherwise specified.

In the present application, the term room temperature is a natural temperature without warming and cooling, which may mean, for example, any temperature in a range of about 10° C. to about 30° C., or a temperature of 20° C., 25° C. or 23° C. or so.

In the present application, the term normal pressure is a natural pressure without pressurizing or depressurizing, which may be, for example, 1 atm or so, such as atmospheric pressure.

As long as the solvent included in the coating composition has a boiling point in the above range, a component of a single chemical species may also be applied, and if necessary, a mixture of different chemical species components having a boiling point in the above range may also be applied.

In one example, the solvent may be a mixed solvent in a state where a number of solvents having different boiling points, provided that the boiling point is in the above range, are mixed. As long as the boiling point of each of the solvents constituting the mixed solvent is in the above range, the boiling point of the mixed solvent may also be in the above range even if these are mixed. In addition, the above-described physical properties (density or dielectric constant, etc.) for the solvent other than the boiling point may also be physical properties for the mixed solvent.

For example, the mixed solvent may comprise at least three solvents having different boiling points. Specifically, the mixed solvent may comprise a solvent having a boiling point of more than 100° C. and 115° C. or less (hereinafter, "first solvent"), a solvent having a boiling point of more than 85° C. and 100° C. or less (hereinafter, "second solvent") and a third solvent having a boiling point of 79° C. or more and 85° C. or less.

The mixed solvent may comprise the first solvent as a main component. That is, the mixed solvent may comprise the first solvent, on the basis of weight, in an amount of 50% or more, 55% or more, 60% or more, 65% or more, 70% or more, 75% or more, 80% or more, 85% or more, or 90% or more, and may comprise it in an amount of less than 100%, 99% or less, 98% or less, 97% or less, 96% or less, or 95% or less.

In one example, it may be appropriate that the mixed solvent basically comprises the first solvent, but further comprises the second solvent and/or third solvent. In this case, the mixing ratio between the solvents in the mixed solvent may be appropriately adjusted within the range to ensure the compatibility of the above-mentioned release agent and the ultraviolet absorber to be described below.

For example, when the mixed solvent is a combination of two solvents further comprising the second solvent in addition to the first solvent, the mixed solvent may comprise the second solvent in a ratio ranging from 50 parts by weight to 200 parts by weight relative to 100 parts by weight of the first solvent. In another example, the ratio may be 60 parts by weight or more, 65 parts by weight or more, 70 parts by weight or more, 75 parts by weight or more, 80 parts by weight or more, 85 parts by weight or more, 90 parts by weight or more, 95 parts by weight or more, or 100 parts by weight or more, and may be 190 parts by weight or less, 180 parts by weight or less, 170 parts by weight or less, 160 parts by weight or less, 150 parts by weight or less, 140 parts by weight or less, 130 parts by weight or less, 120 parts by weight or less, 110 parts by weight or less, or 100 parts by weight or less.

When the mixed solvent is a combination of two solvents further comprising the third solvent in addition to the first solvent, the mixed solvent may comprise the third solvent in a ratio ranging from 50 parts by weight to 200 parts by weight relative to 100 parts by weight of the first solvent. In another example, the ratio may be 60 parts by weight or more, 65 parts by weight or more, 70 parts by weight or more, 75 parts by weight or more, 80 parts by weight or more, 85 parts by weight or more, 90 parts by weight or more, 95 parts by weight or more, or 100 parts by weight or more, and may be 190 parts by weight or less, 180 parts by weight or less, 170 parts by weight or less, 160 parts by weight or less, 150 parts by weight or less, 140 parts by weight or less, 130 parts by weight or less, 120 parts by weight or less, 110 parts by weight or less, or 100 parts by weight or less.

When the mixed solvent is a combination of three solvents further comprising both the second and third solvents in addition to the first solvent, the mixed solvent may comprise the second solvent in a ratio ranging from 10 parts by weight to 100 parts by weight, and may comprise the third solvent in a ratio ranging from 10 parts by weight to 100 parts by weight, based on 100 parts by weight of the first solvent. The ratios of the second solvent and the third solvent may each be 15 parts by weight or more, or 20 parts by weight or more, and may each be 90 parts by weight or less, or 80 parts by weight or less.

The solvent included in the coating composition is not particularly limited as long as it satisfies the above-described physical properties. For example, as the solvent, any one of the first to third solvents or a mixed solvent of two or more thereof may be applied. On the other hand, as described above, in the case of the mixed solvent combining two or more of the first to third solvents, it may be appropriate that a combination of the first solvent and the second solvent, a combination of the first solvent and the third solvent and a combination of all the first to third solvents are applied as the mixed solvent.

As the first solvent, a solvent such as toluene may be applied. As the second solvent, a solvent such as n-heptane may be applied. As the third solvent, a solvent such as methyl ethyl ketone may be applied.

In one example, the coating composition may comprise the solvent in a ratio of 500 to 2000 parts by weight relative to 100 parts by weight of the release agent. When only one component of the solvent examples is applied as the solvent, the ratio may mean the ratio of the component alone in the coating composition. In addition, when the solvent is a mixed solvent that two or more of the solvent examples are used in combination, the ratio may mean the ratio of the mixed solvent in the coating composition. In another example, the ratio may be 600 parts by weight or more, 700 parts by weight or more, 800 parts by weight or more, 900 parts by weight or more, or 950 parts by weight or more, and may also be 1900 parts by weight or less, 1800 parts by weight or less, 1700 parts by weight or less, 1600 parts by weight or less, 1500 parts by weight or less, 1400 parts by weight or less, 1300 parts by weight or less, 1200 parts by weight or less, 1100 parts by weight or less, or 1050 parts by weight or less.

For ensuring ultraviolet blocking performance and protecting an adherend from ultraviolet rays, the coating composition of the present application may comprise an ultraviolet absorber as a compound having ultraviolet absorption ability together with the release agent and the solvent.

In the present application, the term "ultraviolet absorption ability" may mean a physical property exhibiting the minimum transmittance in at least some or all regions of the wavelength region of 10 nm to 450 nm in a transmittance spectrum for wavelengths, or exhibiting the maximum absorbance in at least some or all regions of the wavelength region of 10 nm to 450 nm in an absorbance spectrum for wavelengths.

In the present application, the term "maximum absorption wavelength" may mean the wavelength representing the minimum transmittance or the maximum absorbance.

In the present application, the content of the ultraviolet absorber may be adjusted in consideration of the purpose of the present application. The higher the content of the ultraviolet absorber, the higher the ultraviolet absorption ability, in particular, the blocking performance against light having a wavelength of 380 nm or more, of the release layer produced from the coating composition. In one example, the coating composition may comprise the ultraviolet absorber in a content of at least 0.1 parts by weight relative to 100 parts by weight of the release agent. In another example, the amount may be 1 part by weight or more, 5 parts by weight or more, 10 parts by weight or more, 15 parts by weight or more, 20 parts by weight or more, 25 parts by weight or more, or 30 parts by weight or more, and the upper limit thereof is not particularly limited, but may be, for example, 50 parts by weight or less, 45 parts by weight or less, 40 parts by weight or less, or 35 parts by weight or less.

The maximum absorption wavelength of the ultraviolet absorber may be in a range of ultraviolet rays, for example 10 nm to 450 nm. In one example, the maximum absorption wavelength of the ultraviolet absorber may be 340 nm or more, 350 nm or more, or 360 nm or more, and may be 445 nm or less, 440 nm or less, 435 nm or less, 430 nm or less, 425 nm or less, 420 nm or less, 415 nm or less, or 410 nm or less.

In one example, the ultraviolet absorber may be a compound of Formula 1 below:

[Formula 1]

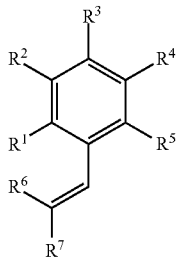

In Formula 1, $R^1$ to $R^5$ are each independently hydrogen, an alkyl group, —$OX^1$ or —$NX^1{}_2$, but one to two of $R^1$ to $R^5$ are —$OX^1$ or —$NX^1{}_2$, where $X^1$ is hydrogen or an alkyl group, and $R^6$ and $R^7$ are each independently hydrogen, a cyano group, —C(=O)—$X^2$, —C(=O)—O—$X^2$, —O—C(=O)—$X^2$, or —$NO_2$, where $X^2$ is an alkyl group or an aryl group.

As the alkyl group applied to any one of $R^1$ to $R^5$ above, and $X^1$ or $X^2$, an alkyl group having 1 to 20, 1 to 16, 1 to 12, 1 to 8 or 1 to 4 carbon atoms may be used. In addition, as the aryl group applied to $X^2$ above, an aryl group having 6 to 30 carbon atoms, 6 to 25 carbon atoms, 6 to 21 carbon atoms, 6 to 18 carbon atoms or 6 to 13 carbon atoms may be used.

$R^3$ in Formula 1 may be —$OX^1$ or —$NX^1{}_2$. Also, in this case, any one of $R^1$ to $R^2$ and $R^4$ to $R^5$ may be —$OX^1$ or —$NX^1{}_2$, or all of $R^1$ to $R^2$ and $R^4$ to $R^5$ may also be hydrogen. In another example, any one of $R^1$ to $R^2$ and $R^4$ to $R^5$ in Formula 1 may also be —$OX^1$.

$R^6$ or $R^7$ in Formula 1 may be a cyano group, —C(=O)—$X^2$, —C(=O)—O—$X^2$, or —O—C(=O)—$X^2$. In this case, $X^2$ above may be an alkyl group. Specifically, $R^6$ or $R^7$ in Formula 1 may also be a cyano group or —C(=O)—O—$X^2$, and it is appropriate that if either $R^6$ or $R^7$ is a cyano group, the other is —C(=O)—O—$X^2$.

The compound of Formula 1 may be a reaction product of a compound of Formula 2 below and a compound of Formula 3 below:

[Formula 2]

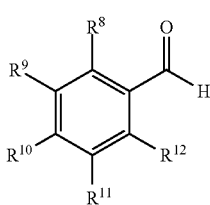

In Formula 2, $R^8$ to $R^{12}$ are each independently hydrogen, an alkyl group, —$OX^3$, or —$NX^3{}_2$, but one to two of $R^8$ to $R^{12}$ are —$OX^3$ or —$NX^3{}_2$, where $X^3$ may be hydrogen or an alkyl group:

[Formula 3]

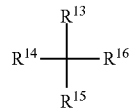

In Formula 3, $R^{13}$ to $R^{16}$ are each independently hydrogen, an alkyl group, a cyano group, —C(=O)—$X^4$, —C(=O)—O—$X^4$, —O—C(=O)—$X^4$, or —$NO_2$, but at least two of $R^{13}$ to $R^{16}$ are hydrogen, where $X^4$ may be an alkyl group or an aryl group.

Here, as the alkyl group applied to any one of $R^{13}$ to $R^{16}$ or X4, an alkyl group having 1 to 20, 1 to 16, 1 to 12, 1 to 8 or 1 to 4 carbon atoms may be used. In addition, here, as the aryl group applied to $X^4$, an aryl group having 6 to 30 carbon atoms, 6 to 25 carbon atoms, 6 to 21 carbon atoms, 6 to 18 carbon atoms or 6 to 13 carbon atoms may be used.

The coating composition of the present application comprising the compound of Formula 1, that is, the reaction product of the compounds of Formulas 2 and 3 above as the ultraviolet absorber has particularly excellent blocking performance against light having, particularly, a wavelength of about 380 nm or more, specifically, a wavelength in the range of 380 nm to 450 nm. Accordingly, when the release film formed of the coating composition comprising the above-described ultraviolet absorber has been applied to the pressure-sensitive adhesive, it is possible to effectively prevent post-curing by ultraviolet rays applied from the outside of the pressure-sensitive adhesive.

In one example, $R^{10}$ in Formula 2 may be —$OX^3$ or —$NX^3{}_2$. Also, when $R^{10}$ in Formula 2 above is —$OX^3$ or —$NX^3{}_2$, any one of $R^8$ to $R^9$ and $R^{11}$ to $R^{12}$ in Formula 2 above may be —$OX^3$ or —$NX^3{}_2$. Specifically, when $R^{10}$ in Formula 2 above is —$OX^3$, any one of $R^8$ to $R^9$ and $R^{11}$ to $R^{12}$ may be —$OX^3$, and all the other three functional groups may be hydrogen. In another example, when $R^{10}$ in Formula 2 above is —$NX^3{}_2$, all of $R^8$ to $R^9$ and $R^{11}$ to $R^{12}$ in Formula 2 may also be hydrogen.

In one example, when at least two of $R^{13}$ to $R^{16}$ in Formula 3 are hydrogen, the remaining two are each independently a cyano group, —C(=O)—$X^4$, —C(=O)—O—$X^4$, or —O—(=O)—$X^4$. In this case, $X^4$ above may be an alkyl group. Specifically, when at least two of $R^{13}$ to $R^{16}$ in Formula 3 are hydrogen, the other two may each independently be a cyano group or —C(=O)—O—$X^4$, where it is suitable that if one is a cyano group, the other is —C(=O)—O—$X^4$.

The compound of Formula 1 may be a reaction product that the compound of Formula 3 is reacted in a range of 0.5 mol to 1.5 mol per mole of the compound of Formula 2. The amount of the compound of Formula 3 above may be 0.6 mol or more, 0.7 mol or more, 0.8 mol or more, 0.9 mol or more, or 0.95 mol or more, and may be 1.4 mol or less, 1.3 mol or less, 1.2 mol or less, 1.1 mol or less, or 1.05 or less. Also, in another example, it may be appropriate that the compound represented by Formula 2 above and the compound represented by Formula 3 above are mixed in a stoichiometric ratio.

In the present application, the term "reaction product" of a plurality of compounds may mean a substance produced by a chemical reaction in which the compounds are used as reactants. That is, here, the ultraviolet absorber represented by Formula 1 may be a compound produced by a chemical reaction between the compound represented by Formula 2 above and the compound represented by Formula 3.

For example, the compound represented by Formula 3 may have a pKa value of 20 or less. In another example, the value may be 19 or less, 18 or less, 17 or less, or 16 or less. In addition, the lower limit of the value may be, for example, 7 or more, 8 or more, 9 or more, 10 or more, or 11 or more, but is not particularly limited, and the smaller the value is, the more excellent the blocking performance against the long-wavelength ultraviolet rays upon reaction with the compound represented by Formula 2 above may be.

Here, the pKa value of any compound may mean a value of an acid dissociation constant measured at room temperature with respect to a solution in which the compound is dissolved in a predetermined solvent. Here, the acid dissociation constant may have the same meaning as known in the art. Specifically, the acid dissociation constant may mean the ionization equilibrium constant (Ka) of the compound, and the pKa value may be calculated by taking -log to the ionization equilibrium constant. Then, here, as the solvent used as the measurement reference, a known solvent such as water; or DMSO (dimethyl sulfoxide) may be applied, and in the present application, DMSO (dimethyl sulfoxide) has been applied as the reference solvent for the pKa measurement.

The coating composition of the present application may further comprise a metal catalyst that promotes an addition reaction so that foreign matters may not remain in the release layer formed therefrom and the durability thereof may also be ensured. As the metal catalyst, for example, a tin-based catalyst, a platinum-based catalyst, a cerium-based catalyst or a titanium-based catalyst may be used, and in order to improve the release performance of the release agent, it is preferable to apply a platinum-based catalyst.

As the platinum-based catalyst, for example, chloroplatinic acid, an alcohol solution of chloroplatinic acid, a platinum-based compound such as a complex of chloroplatinic acid and an olefin or a complex of chloroplatinic acid and an alkenylsiloxane, platinum-supported silica, platinum graphite, platinum-supported activated carbon, and the like may be used.

The content of the metal catalyst may be adjusted within a range that promotes the reaction between the constituents of the coating composition, but does not lower the release performance of the release agent. In one example, the coating composition may comprise a metal catalyst in an amount of 1 to 10 parts by weight relative to 100 parts by weight of the release agent. In another example, the amount may be 1.5 parts by weight or more, 2 parts by weight or more, or 2.5 parts by weight or more, and may be 9 parts by weight or less, 8.5 parts by weight or less, 8 parts by weight or less, 7.5 parts by weight or less, 7 parts by weight or less, 6.5 parts by weight or less, 6 parts by weight or less, 5.5 parts by weight or less, 5 parts by weight or less, 4.5 parts by weight or less, 4 parts by weight or less, 3.5 parts by weight or less, or 3 parts by weight or less.

For the purpose of preventing yellowing and the like, the coating composition of the present application may also further comprise additives such as antioxidants, ultraviolet stabilizers, thermal stabilizers, plasticizers, antistatic agents, fillers, antifoaming agents, surfactants, nucleating agents, flame retardants or weathering stabilizers within a range capable of achieving the object of the present invention, in addition to the above components.

In one example, the coating composition of the present application may be a one-component coating composition. That is, the coating composition may form a release layer even if separate crosslinking agent and/or curing agent are not formulated before use. In addition, since the coating composition is a one-component coating composition, the release layer to be described below may be formed even if the coating composition is coated only once.

The present application also relates to a release layer formed of the coating layer. The release layer is a layer of the coating composition.

In the present application, the term "layer of the coating composition" may mean a layer comprising the cured product of the coating composition through a method such as coating, curing, or aging of the coating composition. In the present application, the term "curing of the coating composition" may mean implementing a cross-linked structure in the coating composition through physical or chemical actions or reactions between the components included in the coating composition. For example, in the release agent layer, the ultraviolet absorber may also be present in a state dispersed in the release agent.

Here, the curing may proceed, for example, by a method such as application of heat. That is, the coating composition may be a thermosetting coating composition.

In one example, the method of forming the release layer is not particularly limited. For example, the release layer may also be produced by coating the coating composition on a polymer base material, such as PET (polyethylene terephthalate), which is separately provided, and applying heat thereto to cure the coating composition, and then further through an aging process within an appropriate temperature range.

As a method of applying the coating composition, for example, a known coating method such as reverse roll coating, gravure coating, rod coating, air duct coating or bar coating may be used.

The present application also relates to a release film. The release film may comprise at least the release layer.

In one example, the release film may have haze of 9% or less. In another example, the haze value may be 8.9% or less, or 8.85% or less, and the lower limit thereof is not particularly limited, but in another example, it may be more than 0%, 0.1% or more, 1% or more, 2% or more, 3% or more, or 3.5% or more. The haze may be a value measured according to ASTM D1003 standard by storing the release layer at a temperature of 85° C. and 85% relative humidity for 100 hours, and then leaving it at a temperature of 25° C. and 50% relative humidity for 1 hour. The fact that the release film has the above-described haze value may mean that sufficient compatibility between components constituting the coating composition has been ensured.

In one example, the release layer may have a surface energy in a range of 10 mN/m to 50 mN/m. In another example, the surface energy value may be 11 mN/m or more, 12 mN/m or more, 13 mN/m or more, 14 mN/m or more, or 15 mN/m or more, and may also be 49 mN/m or less, 48 mN/m or less, 47 mN/m or less, 46 mN/m or less, 45 mN/m or less, 44 mN/m or less, 43 mN/m or less, 42 mN/m or less, 41 mN/m or less, 40 mN/m or less, 39 mN/m or less, 38 mN/m or less, 37 mN/m or less, 36 mN/m or less, 35 mN/m or less, 34 mN/m or less, 33 mN/m or less, or 32 mN/m or less.

The surface energy may be measured in the following order:
(1) The process of dropping the deionized water whose surface tension is known on the release layer, and obtaining the contact angle thereof is repeated five times to obtain an average value of the obtained five contact angle values.
(2) Identically, the process of dropping the diiodomethane whose surface tension is known on the release layer and obtaining the contact angle thereof is repeated five times to obtain an average value of the obtained five contact angle values.

(3) The surface energy can be calculated by substituting the value (Strom value) regarding the solvent surface tension by the Owens-Wendt-Rabel-Kaelble method using the obtained average values of the contact angles for the deionized water and diiodomethane measured in the processes (1) and (2) above.

The fact that the release layer has a surface energy value within the above range may mean that the adherend, for example, the pressure-sensitive adhesive layer, may be easily peeled off from the release layer.

The release film may further comprise a pressure-sensitive adhesive layer. At this time, the release layer may be present on at least one side of the pressure-sensitive adhesive layer. When the release film comprises a pressure-sensitive adhesive layer, the release film may also be referred to as a pressure-sensitive adhesive sheet. The release film may be in the form that the release layer contacts the pressure-sensitive adhesive layer.

In order to ensure proper cohesion force between the pressure-sensitive adhesive layer and the release layer, a component such as silicone oil, which is migrated from the release layer, may be further included between these layers.

When the release layers are present on both sides of the pressure-sensitive adhesive layer, any one of the release layers may be a heavily peeling type, and the other may be a lightly peeling type. Here, the heavily peeling release layer may mean that the peel force on the pressure-sensitive adhesive layer is higher than that of the lightly peeling release layer, and the lightly peeling release layer may mean that the peel force on the pressure-sensitive adhesive layer is lower than that of the heavily peeling release layer.

When the pressure-sensitive adhesive layer is attached to the adherend using the release film, a method of detaching the lightly peeling release layer, attaching the exposed pressure-sensitive adhesive layer to the adherend, and then detaching the heavily peeling release layer is applied. Thereafter, the pressure-sensitive adhesive may also be finally cured by a method such as ultraviolet irradiation to fix the pressure-sensitive adhesive layer on the adherend.

In addition, the content of the release agent in the coating composition may also be appropriately adjusted so that the lightly peeling release layer and the heavily peeling release layer may have peel force in different sizes.

The release peel force of the release layer on the pressure-sensitive adhesive layer may be in a range of 10 gf/in to 40 gf/in. In another example, the release peel force value may be 11 gf/in or more, 12 gf/in or more, 13 gf/in or more, 14 gf/in or more, 15 gf/in or more, 16 gf/in or more, 17 gf/in or more, 18 gf/in or more, 19 gf/in or more, 20 gf/in or more, or 21 gf/in or more, and may also be 39 gf/in or less, 38 gf/in or less, 37 gf/in or less, 36 gf/in or less, 35 gf/in or less, 34 gf/in or less, 33 gf/in or less, 32 gf/in or less, 31 gf/in or less, 30 gf/in or less, or 29 gf/in or less. The release peel force of the release layer may be measured in the following order. The release layer is attached to a standard pressure-sensitive adhesive tape (Tesa 7475, Tesa AG) to be in contact with each other. The release layer attached to the standard pressure-sensitive adhesive tape is stored at a temperature of about 25° C. for 24 hours. The release peel force of the release layer is measured, while peeling the release layer from the standard adhesive tape with a peel angle of 180 degrees and a peel rate of 300 cm/min under conditions of a temperature of 25° C. and 50% relative humidity.

From the viewpoint of attaching the pressure-sensitive adhesive layer to the adherend having various forms, a pressure-sensitive adhesive in a semi-cured state may be used as its component. Here, the semi-cured state of the pressure-sensitive adhesive may mean a state that it is further cured by application of heat or irradiation of active energy rays or the like, whereby it can be fixed to the adherend. As the pressure-sensitive adhesive in the semi-cured state, for example, a compound having an ultraviolet curing functional group such as an epoxy group, a (meth) acryloyl group or an unsaturated double bond may be used.

In one example, as long as the pressure-sensitive adhesive layer comprises a component having tackiness and simultaneously capable of being cured upon irradiation with ultraviolet rays, the kind is not particularly limited, but it may comprise, appropriately, an acrylic polymer.

In one example, the acrylic polymer may comprise a polymerized unit of an alkyl group-containing (meth)acrylate monomer. An example of the monomer may include a monomer such as methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth) acrylate, 2-ethylbutyl (meth)acrylate, n-octyl (meth)acrylate, isooctyl (meth)acrylate, isononyl (meth)acrylate, lauryl (meth)acrylate and/or tetradecyl (meth)acrylate. Here, the (meth)acrylate is used to mean acrylate or methacrylate.

In the present application, the polymerized unit of any monomer may mean a skeleton of a polymer formed by polymerization or curing of the monomer.

The acrylic polymer may comprise, as a main component, the polymerized unit of the alkyl group-containing (meth) acrylate monomer. That is, the acrylic polymer may comprise the unit in an amount of about 50 wt % or more, 55 wt % or more, 60 wt % or more, 65 wt % or more, 70 wt % or more, 75 wt % or more, 80 wt % or more, 85 wt % or more, 90 wt % or more, or 95 wt % or more, based on the total. In another example, an amount may be about 100 wt % or less, or about 99 wt % or less or so.

For improvement of cohesion force or the like, the acrylic polymer may further comprise, as an additionally polymerized unit, a polymerized unit of a copolymerizable monomer having a polar group. Here, the copolymerizable monomer having a polar functional group may mean a monomer, such as the alkyl group-containing (meth)acrylate monomer unit, which is copolymerizable with other compounds forming an acrylic polymer, and can also provide the side chain or the terminal of the polymer with the polar functional group after being copolymerized. The polar functional group may be, for example, a functional group capable of reacting with a multifunctional crosslinking agent, which is described below, by application of heat to implement a cross-linked structure, or serving to improve wettability of the pressure-sensitive adhesive layer. The polar functional group may be exemplified by, for example, an hydroxyl group, a carboxyl group or its anhydride group, an acid group such as a sulfonic acid group or a phosphoric acid group, a glycidyl group, an amino group or an isocyanate group, and the like.

The copolymerizable monomer having a polar group may be, for example, a copolymerizable monomer having a hydroxyl group. The copolymerizable monomer having a hydroxyl group may be a monomer capable of comprising a site copolymerizable with other monomers forming the acrylic polymer and a hydroxyl group simultaneously to provide the acrylic polymer with the hydroxyl group after polymerization. Such a monomer may be exemplified by a hydroxyalkyl (meth)acrylate such as 2-hydroxyethyl (meth) acrylate, 2-hydroxypropyl (meth)acrylate, 4-hydroxybutyl (meth)acrylate, 6-hydroxyhexyl (meth)acrylate or 8-hydroxyoctyl (meth)acrylate, and the like, but is not limited thereto.

The acrylic polymer may comprise, for example, the polymerized unit of the copolymerizable monomer having a polar group in an amount of 0.1 parts by weight to 30 parts by weight relative to 100 parts by weight of the alkyl group-containing (meth)acrylate monomer unit. In another example, the ratio may be about 0.5 parts by weight or more, 0.7 parts by weight or more, or 0.9 parts by weight or more, or may be about 25 parts by weight or less, 20 parts by weight or less, 15 parts by weight or less, 10 parts by weight or less, 5 parts by weight or less, or 3 parts by weight or less, but this amount may be changed in consideration of the desired cohesion force or wettability.

From the viewpoint of controlling a glass transition temperature or imparting other functionalities, the acrylic polymer may further comprise, for example, a polymerized unit derived from a known comonomer, such as a nitrogen-containing monomer such as (meth)acrylonitrile, (meth) acrylamide, N-methyl (meth)acrylamide, N-vinyl pyrrolidone, N-vinyl caprolactam or N-butoxymethyl (meth) acrylamide; a styrene-based monomer such as styrene or methyl styrene; glycidyl (meth)acrylate; or a carboxylic acid vinyl ester such as vinyl acetate. Such a polymerized unit may be included, for example, in an amount of 20 parts by weight or less relative to other polymerized units.

As the acrylic polymer, for example, a polymer having a weight average molecular weight (Mw) of 800,000 or more may be used. In this specification, the term "weight average molecular weight" is a converted value for standard polystyrene measured by GPC (gel permeation chromatograph), and in this specification, the "molecular weight" may mean a "weight average molecular weight," unless otherwise specified. When the polymer has a molecular weight of 800,000 or more, the durability of the pressure-sensitive adhesive can be kept in a suitable range. In another example, the molecular weight may be about 850,000 or more, 900,000 or more, 950,000 or more, 1,000,000 or more, 1,100,000 or more, 1,200,000 or more, or 1,300,000 or more, or may also be in a level of about 2,500,000 or less, about 2,000,000 or less, 1,800,000 or less, 1,700,000 or less, 1,600,000 or less, or about 1,500,000 or less or so.

The acrylic polymer may be prepared through a known polymerization method. For example, a monomer mixture, in which a (meth)acrylic acid ester monomer and a polar group-containing copolymerizable monomer and/or other comonomers, and the like are suitably formulated according to the desired weight ratio, may be applied to a usual polymerization method such as solution polymerization, photo polymerization, bulk polymerization, suspension polymerization or emulsion polymerization to prepare an acrylic polymer. In the polymerization process, a polymerization initiator or a chain transfer agent, and the like may also be used together, if necessary.

Advantageous Effects

The coating composition of the present application has excellent compatibility between the components.

There is an advantage that the release layer formed from the coating composition of the present application has low transmittance for light having a long wavelength, for example, a wavelength of 380 nm or more.

BEST MODE

Hereinafter, the present application will be described in more detail with reference to Examples and Comparative Examples, but the scope of the present application is not limited to Examples above.

1. Primary Compatibility Evaluation

Turbidity of the coating compositions of Examples 1 and 2 and Comparative Examples 1 and 2 was visually observed to evaluate compatibility between the components of the composition, and the evaluation criteria are as follows.
<Evaluation Criteria>
O: No emulsion is formed, transparent
Δ: A small amount of emulsion is formed, but there is no problem in commercial use.
X: A large amount of emulsion is formed to be opaque 2. Secondary Compatibility Evaluation Turbidity of the coating compositions of Examples 1 to 18 and Comparative Examples 3 to 8 was visually observed to evaluate compatibility between the components of the composition. Compatibility evaluation criteria are as follows.
<Evaluation Criteria>
O: No emulsion is formed, transparent
Δ: A small amount of emulsion is formed, but there is no problem in commercial use.
X: A large amount of emulsion is formed to be opaque 3. Haze Measurement The coating compositions of Examples 1 to 18 and Comparative Examples 3 to 8 were each applied on a PET (polyethylene terephthalate) base material having a thickness of about 38 μm and a size of 5 cm×5 cm (width×length) with a wire-wound rod (Meyer bar) #8 for coating, cured at a temperature of about 130° C. for about 1 minute, and subsequently aged at a temperature of about 50° C. for about 24 hours to produce a release film specimen in which a release layer having a thickness of about 0.1 μm was formed on the base material.

After storing the specimen at a temperature of 85° C. and 85% relative humidity for 100 hours, it was left to stand at a temperature of 25° C. and 50% relative humidity for 1 hour, and then the haze of the specimen was measured by ASTM D1003 standard using a spectrophotometer (NDH700SP, Nippon Denshoku).

4. Transmittance Measurement

The coating compositions of Examples 1 to 2 and 19 to 21, and Comparative Example 9 were each applied on a PET (polyethylene terephthalate) base material having a thickness of about 38 μm and a size of 5 cm×5 cm (width×length) with a wire-wound rod (Meyer bar) #8 for coating, cured at a temperature of about 130° C. for about 1 minute, and subsequently aged at a temperature of about 50° C. for about 24 hours to produce a release film specimen in which a release layer having a thickness of about 0.1 μm was formed on the base material.

Figure 1:
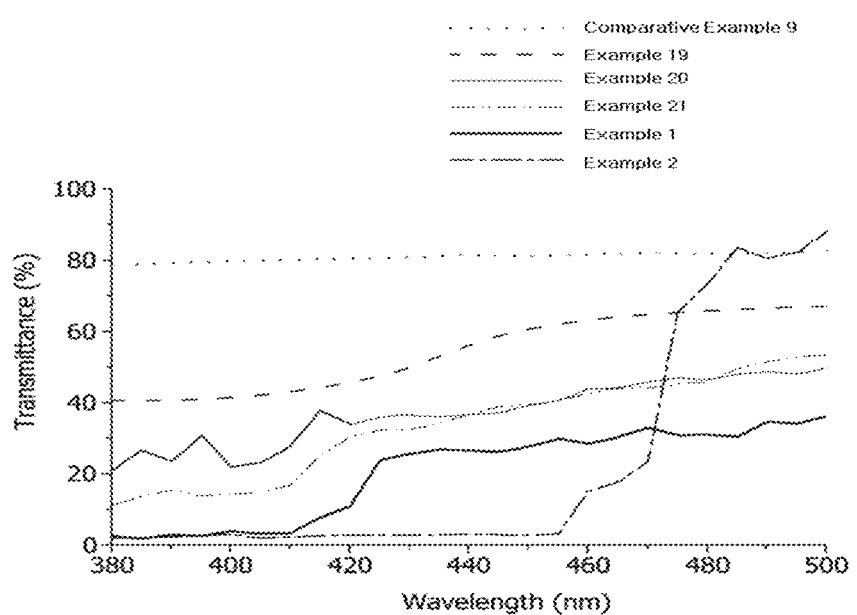
FIG. 1 shows transmittance of the release layers prepared in Examples 1 to 2 and 19 to 21 and Comparative Example 9 for each wavelength.
Figure 2:
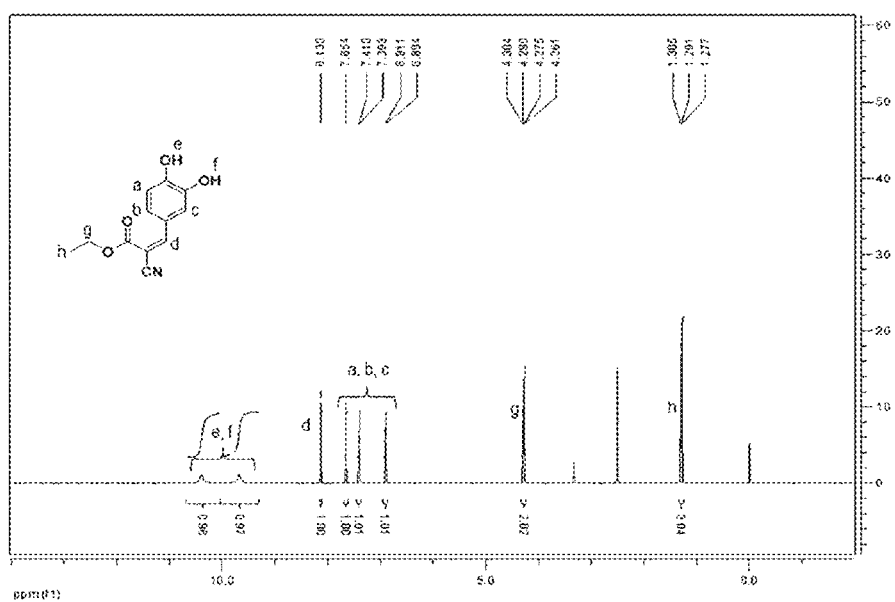
FIG. 2 shows the NMR analysis results of the ultraviolet absorber according to Preparation Example 1.
Figure 3:
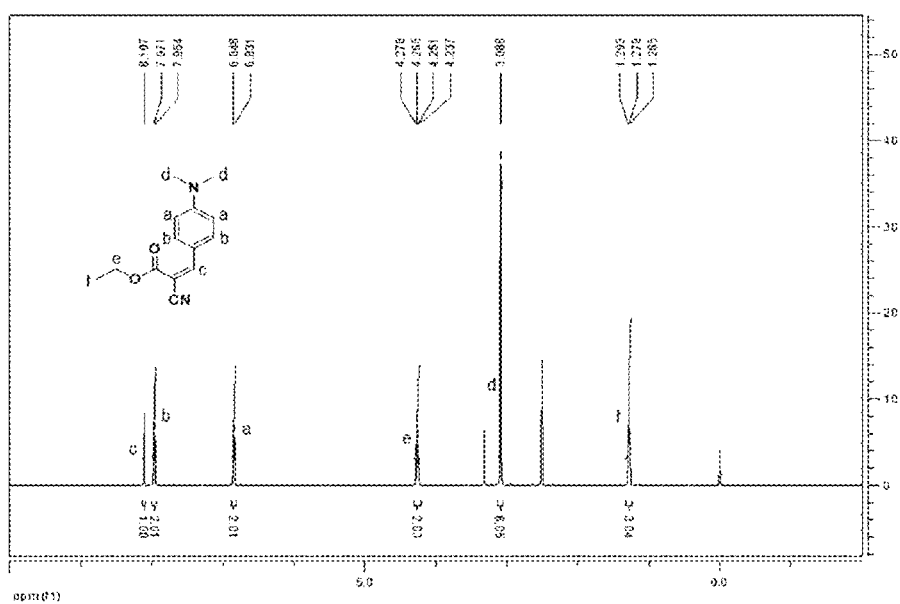
FIG. 3 shows the NMR analysis results of Ultraviolet Absorber B (Eutec's UV-1995).

The transmittance of the specimens for the transmitted light wavelength was measured using a colorimeter (SA5500, Nippon Denshoku), and the results were shown in FIG. 1. Here, when the incident amount of the total light is set to 100, the transmittance is expressed in a % ratio of the transmitted amount of the light therefrom.

5. Release Peel Force Measurement

The coating compositions of Examples 1 to 18 and Comparative Examples 3 to 8 were each applied on a PET (polyethylene terephthalate) base material having a thickness of about 38 μm and a size of 5 cm×5 cm (width×length) with a wire-wound rod (Meyer bar) #8 for coating, cured at a temperature of about 130° C. for about 1 minute, and subsequently aged at a temperature of about 50° C. for about 24 hours to produce a release film specimen in which a release layer having a thickness of about 0.1 μm was formed on the base material.

The release layer of the specimen was attached to a standard adhesive tape (Tesa 7475, Tesa AG) to be in contact with each other and stored at a temperature of about 25° C. for 24 hours, and then the release peel force of the release layer on the standard pressure-sensitive adhesive tape was measured, while peeling the release film specimen with a peel angle of 180 degrees and a peel rate of 300 cm/min under conditions of a temperature of 25° C. and 50% relative humidity. Cheminstruments' AR-1000 was used as a measuring instrument, and Final Test Method No. 10 was applied as a measurement standard.

6. Surface Energy Measurement

The coating compositions of Examples 1 to 18 and Comparative Examples 3 to 8 were each applied on a PET (polyethylene terephthalate) base material having a thickness of about 38 μm and a size of 5 cm×5 cm (width×length) with a wire-wound rod (Meyer bar) #8 for coating, cured at a temperature of about 130° C. for about 1 minute, and subsequently aged at a temperature of about 50° C. for about 24 hours to produce a release film specimen in which a release layer having a thickness of about 0.1 μm was formed on the base material.

The process of dropping the deionized water whose surface tension is known on the release layer of the specimen, and obtaining the contact angle thereof is repeated five times to obtain an average value of the obtained five contact angle values, and identically, the process of dropping the diiodomethane whose surface tension is known thereon and obtaining the contact angle thereof is repeated five times to obtain an average value of the obtained five contact angle values. Then, the surface energy was obtained by substituting the value (Strom value) regarding the solvent surface tension by the Owens-Wendt-Rabel-Kaelble method using the obtained average values of the contact angles for the deionized water and diiodomethane. Dataphysics' OCA 20 instrument was used as an instrument to measure the contact angle.

Preparation Example 1—Synthesis of Ultraviolet Absorber (A)

An ultraviolet absorber (A) as a compound of Formula C-1 below was prepared according to the following order.

1) A compound of Formula A-1 below and a compound of Formula B-1 below (pKa value for dimethyl sulfoxide: 13.1) are placed in a reactor containing ethanol in a molar ratio of 1:1 and stirred.
2) DBU (1,8-diazabicyclo(5.4.0)undec-7-ene) is slowly introduced into the reactor in an equivalent of 0.1 times the input of the compound of Formula A-1.
3) It is stirred at a temperature of about 25° C. for 12 hours.
4) Hydrochloric acid (HCl) is added in the same mole number as that of ethanol added in Step 2).
5) After completion of the reaction, the resultant of Step 4) is filtered to yield a final product in a solid state.

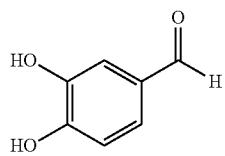

[Formula A-1]

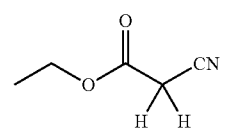

[Formula B-1]

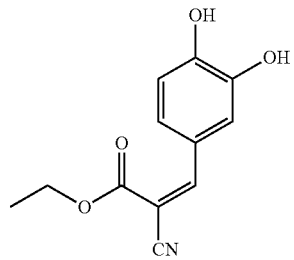

[Formula C-1]

The NMR analysis results of the compound of Formula C-1 were shown in FIG. 1.

Preparation Example 2—Synthesis of Ultraviolet Absorber (C)

An ultraviolet absorber (C) as a compound of Formula C-2 below was prepared in the same method as in Preparation Example 1, except that a compound of Formula A-2 below and the compound of Formula B-1 (pKa value for dimethyl sulfoxide: 13.1) were placed in a reactor containing ethanol in a molar ratio of 1:1 and stirred.

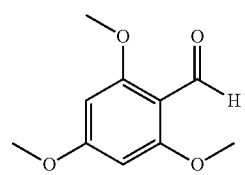

[Formula A-2]

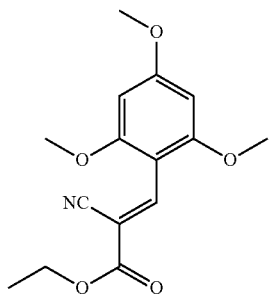

[Formula C-2]

Example 1—Preparation of Coating Composition

About 100 parts by weight of an addition-curable silicone resin (KS847H, Shinetsu) as a release agent, about 1000 parts by weight of toluene as a solvent and about 2.5 parts by weight of a platinum-based catalyst (PL-50T, Shinetsu) were mixed and then about 30 parts by weight of the ultraviolet absorber (A) was added thereto to prepare a coating composition.

Examples 2 to 21 and Comparative Examples 1 to 9—Preparation of Coating Composition Coating compositions were prepared in the same method as in Example 1 except for employing the compositions according to Tables 1 to 5 below.

TABLE 1

|  |  | Example | | | | | |
|---|---|---|---|---|---|---|---|
|  |  | 1 | 2 | 3 | 4 | 5 | 6 |
| Release Agent | Kind | KS847H | KS847H | KS847H | KS847H | KS847H | KS847H |
|  | Content | 100 | 100 | 100 | 100 | 100 | 100 |
| Solvent | Kind | 1 | 1 | 2 | 2 | 3 | 3 |
|  | Content | 1000 | 1000 | 1000 | 1000 | 1000 | 1000 |
| Ultraviolet Absorber | Kind | A | B | A | B | A | B |
|  | Content | 30 | 30 | 30 | 30 | 30 | 30 |
| Catalyst | Kind | PL-50T | PL-50T | PL-50T | PL-50T | PL-50T | PL-50T |
|  | Content | 2.5 | 2.5 | 2.5 | 2.5 | 2.5 | 2.5 |

TABLE 2

|  |  | Example | | | | | |
|---|---|---|---|---|---|---|---|
|  |  | 7 | 8 | 9 | 10 | 11 | 12 |
| Release Agent | Kind | KS847H | KS847H | KS847H | KS847H | KS847H | KS847H |
|  | Content | 100 | 100 | 100 | 100 | 100 | 100 |
| Solvent | Kind | MIX1 | MIX1 | MIX2 | MIX2 | MIX3 | MIX3 |
|  | Content | 1000 | 1000 | 1000 | 1000 | 1000 | 1000 |
| Ultraviolet Absorber | Kind | A | B | A | B | A | B |
|  | Content | 30 | 30 | 30 | 30 | 30 | 30 |
| Catalyst | Kind | PL-50T | PL-50T | PL-50T | PL-50T | PL-50T | PL-50T |
|  | Content | 2.5 | 2.5 | 2.5 | 2.5 | 2.5 | 2.5 |

TABLE 3

|  |  | Example | | | | | |
|---|---|---|---|---|---|---|---|
|  |  | 13 | 14 | 15 | 16 | 17 | 18 |
| Release Agent | Kind | KS847H | KS847H | KS847H | KS847H | KS847H | KS847H |
|  | Content | 100 | 100 | 100 | 100 | 100 | 100 |
| Solvent | Kind | MIX4 | MIX4 | MIX5 | MIX5 | MIX6 | MIX6 |
|  | Content | 1000 | 1000 | 1000 | 1000 | 1000 | 1000 |
| Ultraviolet Absorber | Kind | A | B | A | B | A | B |
|  | Content | 30 | 30 | 30 | 30 | 30 | 30 |
| Catalyst | Kind | PL-50T | PL-50T | PL-50T | PL-50T | PL-50T | PL-50T |
|  | Content | 2.5 | 2.5 | 2.5 | 2.5 | 2.5 | 2.5 |

TABLE 4

|  |  | Example | | | Comparative Example | | |
|---|---|---|---|---|---|---|---|
|  |  | 19 | 20 | 21 | 1 | 2 | 3 |
| Release Agent | Kind | KS847H | KS847H | KS847H | KS847H | KS847H | KS847H |
|  | Content | 100 | 100 | 100 | 100 | 100 | 100 |
| Solvent | Kind | 1 | 1 | 1 | 1 | 1 | 4 |
|  | Content | 1000 | 1000 | 1000 | 1000 | 1000 | 1000 |
| Ultraviolet Absorber | Kind | A | A | A | C | D | A |
|  | Content | 0.5 | 2 | 10 | 30 | 30 | 30 |
| Catalyst | Kind | PL-50T | PL-50T | PL-50T | PL-50T | PL-50T | PL-50T |
|  | Content | 2.5 | 2.5 | 2.5 | 2.5 | 2.5 | 2.5 |

TABLE 5

|  |  | Comparative Example | | | | | |
|---|---|---|---|---|---|---|---|
|  |  | 4 | 5 | 6 | 7 | 8 | 9 |
| Release Agent | Kind | KS847H | KS847H | KS847H | KS847H | KS847H | KS847H |
|  | Content | 100 | 100 | 100 | 100 | 100 | 100 |
| Solvent | Kind | 5 | 6 | 4 | 5 | 6 | 1 |
|  | Content | 1000 | 1000 | 1000 | 1000 | 1000 | 1000 |
| Ultraviolet Absorber | Kind | A | A | B | B | B | — |
|  | Content | 30 | 30 | 30 | 30 | 30 | 0 |
| Catalyst | Kind | PL-50T | PL-50T | PL-50T | PL-50T | PL-50T | PL-50T |
|  | Content | 2.5 | 2.5 | 2.5 | 2.5 | 2.5 | 2.5 |

In Tables 1 to 5 above, the unit of the respective component contents was parts by weight, and the meanings of the abbreviations described in Tables 1 to 5 above were summarized in Table 6 below.

TABLE 6

| Applied Abbreviation | Meaning |
|---|---|
| KS847H: | Addition-curable silicone resin, Shinetsu |
| Solvent 1 | Toluene (boiling point: 110.6° C.) |
| Solvent 2 | n-heptane (boiling point: 98.42° C.) |
| Solvent 3 | Methyl ethyl ketone (boiling point: 79.64° C.) |
| Solvent 4 | Methyl isobutyl ketone (boiling point: 116.5° C.) |
| Solvent 5 | Ethyl acetate (boiling point: 77.1° C.) |
| Solvent 6 | Ethanol (boiling point: 78.37° C.) |
| Solvent MIX1 | Mixed solvent of toluene: n-heptane = 50:50 (weight ratio) |
| Solvent MIX2 | Mixed solvent of toluene: methyl ethyl ketone = 50:50 (weight ratio) |
| Solvent MIX3 | Mixed solvent of toluene: n-heptane: methyl ethyl ketone = 50:40:10 (weight ratio) |
| Solvent MIX4 | Mixed solvent of toluene: n-heptane: methyl ethyl ketone = 50:10:40 (weight ratio) |
| Solvent MIX5 | Mixed solvent of toluene: n-heptane: methyl ethyl ketone = 50:30:20 (weight ratio) |
| Solvent MIX6 | Mixed solvent of toluene: n-heptane: methyl ethyl ketone = 50:20:30 (weight ratio) |

Ultraviolet Absorber A:
Ultraviolet absorber of Preparation Example 1

Structural formula of ultraviolet absorber A

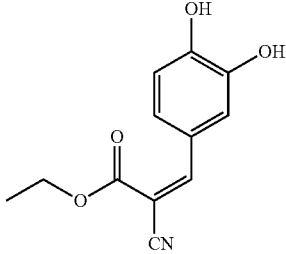 [SMILES: CCOC(=O)/C(C#N)=C\c1ccc(O)c(O)c1]

Ultraviolet Absorber B:
Eutec's UV-1995

Structural formula of ultraviolet absorber B

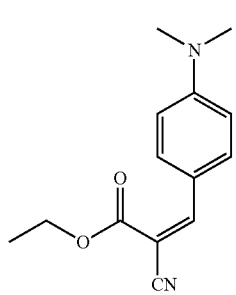 [SMILES: CCOC(=O)/C(C#N)=C\c1ccc(N(C)C)cc1]

TABLE 6-continued

| Applied Abbreviation | Meaning |
|---|---|
| Ultraviolet Absorber C: Ultraviolet absorber of Preparation Example 2 | Structural formula of ultraviolet absorber C |
| Ultraviolet Absorber D CarboProtect (Registered Trademark Tinuvin, CAS. 945857-19-2, BASF) | Structural formula of ultraviolet absorber D |

The primary compatibility evaluation results for the coating compositions of Examples 1 to 2 and Comparative Examples 1 to 2 were described in Table 7 below.

TABLE 7

| Target | | Evaluation Result |
|---|---|---|
| Example | 1 | Δ |
|  | 2 | Δ |
| Comparative Example | 1 | X |
|  | 2 | X |

Through Table 7, it can be seen that when the ultraviolet absorber A or the ultraviolet absorber B, which is a compound included in the category of the structure defined in Formula 1 of the present application, is applied, sufficient compatibility with the release agent in the coating composition is ensured. Through this, it can be seen that it is appropriate to mix at least a compound within the category of the structure defined in Formula 1 with a release agent applied to the coating composition.

The secondary compatibility evaluation results of the coating compositions prepared in Examples 1 to 18 and Comparative Examples 2 to 8, the haze measurement results of the release layer specimens, and the measurement results of the release peel force and the surface energy were shown in Table 8 below.

TABLE 8

| Target | | Secondary Compatibility Evaluation Result | Haze (%) | Release Peel Force (gf/in) | Surface Energy (mN/m) |
|---|---|---|---|---|---|
| Example | 1 | Δ | 7.31 | 19.9 | 25.5 |
|  | 2 | Δ | 8.82 | 21.3 | 24.3 |
|  | 3 | ○~Δ | 5.36 | 15.5 | 23.1 |
|  | 4 | ○~Δ | 6.88 | 15.1 | 22.4 |
|  | 5 | Δ | 6.22 | 31.1 | 27.7 |
|  | 6 | Δ | 7.71 | 27.7 | 28.9 |
|  | 7 | ○~Δ | 5.93 | 21 | 26.6 |
|  | 8 | ○~Δ | 6.71 | 23.3 | 26.7 |
|  | 9 | ○~Δ | 4.78 | 19.8 | 24 |
|  | 10 | ○~Δ | 6.33 | 18.3 | 23.3 |
|  | 11 | ○ | 3.74 | 15.7 | 21.4 |
|  | 12 | ○ | 4.88 | 16.1 | 23.1 |
|  | 13 | ○ | 4.22 | 17.7 | 22.8 |
|  | 14 | ○ | 5.23 | 16.1 | 21.9 |
|  | 15 | ○ | 4.05 | 18.8 | 24.4 |
|  | 16 | ○ | 5.23 | 19.1 | 22.1 |
|  | 17 | ○ | 4.33 | 16.4 | 23.1 |
|  | 18 | ○ | 4.99 | 17 | 23 |
| Comparative Example | 3 | Δ~X | 8.88 | 43.2 | 31.1 |
|  | 4 | Δ~X | 10.01 | 48.8 | 34.4 |

TABLE 8-continued

| Target | Secondary Compatibility Evaluation Result | Haze (%) | Release Peel Force (gf/in) | Surface Energy (mN/m) |
|---|---|---|---|---|
| 5 | X | 15.55 | 88.1 | 29.9 |
| 6 | X | 15.87 | 93.3 | 31.1 |
| 7 | X | 13.43 | 65.1 | 34.4 |
| 8 | X | 14.44 | 78.1 | 36.7 |

Through Table 8, it can be confirmed that in order to ensure compatibility of the release agent and the ultraviolet absorber in the coating composition, to ensure appropriate optical characteristics (haze), as the cured product (release layer) blocks the ultraviolet rays having the wavelengths to be blocked in the present application, and to have appropriate release peel force and surface energy, it is appropriate to apply a solvent having a boiling point within the range defined in the present application.

The invention claimed is:

1. A coating composition comprising a release agent; a solvent having a boiling point in a range of 79° C. to 115° C.; and a compound of Formula 1 below:
wherein the solvent is a mixed solvent comprising a first solvent having a boiling point of more than 100° C. and 115° C. or less, a second solvent having a boiling point of more than 85° C. and 100° C. or less and a third solvent having a boiling point of 79° C. or more and 85° C. or less:

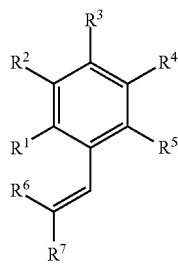

[Formula 1]

wherein, $R^1$ to $R^5$ are each independently hydrogen, an alkyl group, $-OX^1$ or $-NX^1_2$, and one to two of $R^1$ to $R^5$ are $-OX^1$ or $-NX^1_2$, where $X^1$ is hydrogen or an alkyl group, and $R^3$ is $-OX^1$ or $-NX^1_2$, wherein if $R^3$ is $-OX^1$, then $X^1$ is hydrogen, and $R^6$ and $R^7$ are each independendently hydrogen, a cyano group, $-C(=O)-X^2$, $-C(=O)-O-X^2$, $-O-C(=O)-X^2$, or $-NO_2$, where $X^2$ is an alkyl group or an aryl group.

2. The coating composition according to claim 1, wherein any one of $R^1$ to $R^2$ and $R^4$ to $R^5$ is $-OX^1$.

3. The coating composition according to claim 1, wherein $R^6$ and $R^7$ are each independently a cyano group, $-C(=O)-X^2$, $-C(=O)-O-X^2$, or $-O-C(=O)-X^2$, where $X^2$ is an alkyl group.

4. The coating composition according to claim 3, wherein $R^6$ or $R^7$ is a cyano group or $-C(=O)-O-X^2$.

5. The coating composition according to claim 1, wherein the compound of Formula 1 is a reaction product of a compound of Formula 2 below and a compound of Formula 3 below:

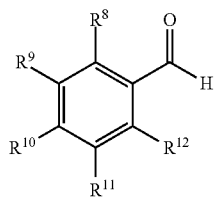

[Formula 2]

wherein, $R^8$ to $R^{12}$ are each independently hydrogen, an alkyl group, $-OX^3$, or $-NX^3_2$, and one to two of $R^8$ to $R^{12}$ are $-OX^3$ or $-NX^3_2$, where $X^3$ is hydrogen or an alkyl group, and $R^{10}$ is $-OX^3$ or $-NX^3_2$, wherein if $R^{10}$ is $-OX^3$, then $X^3$ is hydrogen;

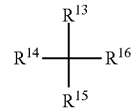

[Formula 3]

wherein, $R^{13}$ to $R^{16}$ are each independently hydrogen, an alkyl group, a cyano group, $-C(=O)-X^4$, $-C(=O)-O-X^4$, $-O-C(=O)-X^4$, or $-NO_2$, and at least two of $R^{13}$ to $R^{16}$ are hydrogen, where $X^4$ is an alkyl group or an aryl group.

6. The coating composition according to claim 5, wherein the compound of Formula 1 is a reaction product, wherein the compound of Formula 3 is reacted in a range of 0.5 mol to 1.5 mol per mole of the compound of Formula 2.

7. The coating composition according to claim 1, wherein the release agent comprises a silicone resin.

8. The coating composition according to claim 7, wherein the silicone resin is an addition-curable silicone resin, a condensation-curable silicone resin or an ultraviolet-curable silicone resin.

9. The coating composition according to claim 1, wherein the release agent is included in an amount within a range of 1 wt % to 20 wt %.

10. The coating composition according to claim 1, wherein the solvent has a density in a range of 0.5 g/cm³ to 1.5 g/cm³.

11. The coating composition according to claim 1, wherein the solvent has a room temperature dielectric constant in a range of 1 to 25.

12. The coating composition according to claim 11, wherein the mixed solvent comprises the first solvent in an amount of 50 wt % or more.

13. The coating composition according to claim 12, wherein the mixed solvent further comprises a second solvent in a ratio within a range of 50 parts by weight to 200 parts by weight relative to 100 parts by weight of the first solvent.

14. The coating composition according to claim 12, wherein the mixed solvent further comprises a third solvent in a ratio within a range of 50 parts by weight to 200 parts by weight relative to 100 parts by weight of the first solvent.

15. The coating composition according to claim 12, wherein the mixed solvent further comprises a second solvent in a ratio within a range of 10 parts by weight to 100 parts by weight relative to 100 parts by weight of the first solvent, and further comprises a third solvent in a ratio within a range of 10 parts by weight to 100 parts by weight relative to 100 parts by weight of the first solvent.

16. The coating composition according to claim 1, wherein the solvent is included in a ratio within a range of 500 parts by weight to 2000 parts by weight relative to 100 parts by wight of the release agent.

17. The coating composition according to claim 1, wherein the compound of Formula 1 is included in an amount of 0.1 parts by weight or more relative to 100 parts by weight of the release agent.

* * * * *